United States Patent
McVeigh et al.

(10) Patent No.: US 7,263,127 B1
(45) Date of Patent: *Aug. 28, 2007

(54) METHOD AND APPARATUS FOR SIMPLIFYING FRAME-BASED MOTION ESTIMATION

(75) Inventors: Jeffrey S. McVeigh, Portland, OR (US); Michael Keith, Salem, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/274,157

(22) Filed: Mar. 22, 1999

Related U.S. Application Data

(63) Continuation-in-part of application No. 09/209,828, filed on Dec. 11, 1998, now Pat. No. 6,904,174.

(60) Provisional application No. 60/080,501, filed on Apr. 2, 1998.

(51) Int. Cl.
*H04B 1/66* (2006.01)

(52) U.S. Cl. .................................. 375/240.15

(58) Field of Classification Search ........... 375/240.01, 375/240.12–240.16, 240.24, 240.25, 240.15; 382/232, 236, 238; H04B 1/66
See application file for complete search history.

(56) References Cited

U.S. PATENT DOCUMENTS

| | | |
|---|---|---|
| 3,716,851 A | 2/1973 | Neumann |
| 4,023,110 A | 5/1977 | Oliver |
| 4,131,765 A | 12/1978 | Kahn |
| 4,217,609 A | 8/1980 | Hatori et al. |
| 4,394,774 A | 7/1983 | Widergren et al. |
| 4,437,119 A | 3/1984 | Matsumoto et al. |
| 4,698,672 A | 10/1987 | Chen et al. |
| 4,760,446 A | 7/1988 | Ninomiya et al. |
| 4,837,818 A | 6/1989 | Hatori et al. |
| 4,864,393 A | 9/1989 | Harradine et al. |
| 4,901,075 A | 2/1990 | Vogel |
| 5,021,879 A | 6/1991 | Vogel |
| 5,068,724 A | 11/1991 | Krause et al. |
| 5,091,782 A | 2/1992 | Krause et al. |
| 5,093,720 A | 3/1992 | Krause et al. |
| 5,113,255 A | 5/1992 | Nagata et al. |
| 5,168,375 A | 12/1992 | Reisch et al. |
| 5,175,618 A | 12/1992 | Ueda et al. |
| 5,223,949 A | 6/1993 | Honjo |
| 5,260,783 A | 11/1993 | Dixit |
| 5,274,442 A | 12/1993 | Murakami et al. |
| 5,293,229 A | 3/1994 | Iu |
| 5,298,991 A | 3/1994 | Yagasaki et al. |
| 5,301,019 A | 4/1994 | Citta |
| 5,301,242 A | 4/1994 | Gonzales et al. |
| 5,317,397 A | 5/1994 | Odaka et al. |
| 5,329,318 A | 7/1994 | Keith |
| 5,343,248 A | 8/1994 | Fujinami |
| 5,412,430 A | 5/1995 | Nagata |
| 5,412,435 A | 5/1995 | Nakajima |

(Continued)

*Primary Examiner*—Tung Vo
(74) *Attorney, Agent, or Firm*—Blakely, Sokoloff, Taylor & Zafman LLP

(57) ABSTRACT

A method for performing motion estimation on a received stream of data comprising a plurality of bidirectionally interpolated frames (B-frame) and a plurality of anchor frames by unidirectionally predicting content of each of the plurality of B-frames from a select anchor frame.

12 Claims, 10 Drawing Sheets

U.S. PATENT DOCUMENTS

| | | |
|---|---|---|
| RE34,965 E | 6/1995 | Sugiyama |
| 5,428,396 A | 6/1995 | Yagasaki et al. |
| RE35,093 E | 11/1995 | Wang et al. |
| 5,469,208 A | 11/1995 | Dea |
| 5,469,212 A | 11/1995 | Lee |
| RE35,158 E | 2/1996 | Sugiyama |
| 5,497,239 A | 3/1996 | Kwon |
| 5,510,840 A | 4/1996 | Yonemitsu et al. |
| 5,539,466 A | 7/1996 | Igarashi et al. |
| 5,543,847 A | 8/1996 | Kato |
| 5,557,330 A | 9/1996 | Astle |
| 5,559,557 A | 9/1996 | Kato |
| 5,565,920 A | 10/1996 | Lee et al. |
| 5,565,922 A | 10/1996 | Krause |
| 5,568,200 A | 10/1996 | Pearlstein et al. |
| 5,587,806 A | 12/1996 | Yamada et al. |
| 5,625,355 A | 4/1997 | Takeno et al. |
| 5,650,823 A * | 7/1997 | Ngai et al. ............. 375/240.15 |
| 5,652,629 A | 7/1997 | Gonzales et al. |
| 5,654,706 A | 8/1997 | Jeong |
| 5,666,461 A | 9/1997 | Igarashi et al. |
| 5,684,534 A | 11/1997 | Harney et al. |
| 5,703,646 A | 12/1997 | Oda |
| 5,711,012 A | 1/1998 | Bottoms et al. |
| 5,801,778 A * | 9/1998 | Ju ........................ 375/240.15 |
| 5,831,688 A | 11/1998 | Yamada et al. |
| 5,841,939 A | 11/1998 | Takahashi et al. |
| 5,852,664 A | 12/1998 | Iverson et al. |
| 5,887,111 A | 3/1999 | Takahashi et al. |
| 5,917,954 A | 6/1999 | Girod et al. |
| 5,946,043 A | 8/1999 | Lee et al. |
| 5,949,948 A | 9/1999 | Krause et al. |
| 5,956,088 A * | 9/1999 | Shen et al. ............ 375/240.25 |
| 5,991,447 A | 11/1999 | Eifrig et al. |
| 5,991,503 A | 11/1999 | Miyasaka et al. |
| 6,052,507 A | 4/2000 | Niida et al. |
| 6,061,400 A | 5/2000 | Pearlstein et al. |
| 6,064,776 A | 5/2000 | Kikuchi et al. |
| 6,081,296 A | 6/2000 | Fukunaga et al. |
| 6,088,391 A | 7/2000 | Auld et al. |
| 6,104,439 A | 8/2000 | Jeong et al. |
| 6,115,070 A | 9/2000 | Song et al. |
| 6,122,317 A | 9/2000 | Hanami et al. |
| 6,125,146 A | 9/2000 | Frencken et al. |
| 6,141,383 A | 10/2000 | Yu |
| 6,144,698 A | 11/2000 | Poon et al. |
| 6,169,821 B1 | 1/2001 | Fukunaga et al. |
| 6,188,725 B1 | 2/2001 | Sugiyama |
| 6,217,234 B1 | 4/2001 | Dewar et al. |
| 6,256,420 B1 | 7/2001 | Sako et al. |
| 6,263,024 B1 | 7/2001 | Matsumoto |
| 6,272,179 B1 | 8/2001 | Kadono |
| 6,421,385 B1 | 7/2002 | Uenoyama et al. |

* cited by examiner

Fig. 2: Prior Art

METHOD AND APPARATUS FOR SIMPLIFYING FRAME-BASED MOTION ESTIMATION

RELATED APPLICATIONS

This non-provisional patent application claims priority to provisional application No. 60/080,501 by Jeffrey McVeigh and Michael Keith for a "Method and Apparatus for Providing Real-Time MPEG-2 Image Processing", filed on Apr. 2, 1998; and further claims priority as a continuation-in-part of non-provisional application Ser. No. 09/209,828 by Michael Keith for a "Simplified Predictive Video Encoder", filed Dec. 11, 1998, now U.S. Pat. No. 6,904,174. Each of the foregoing applications are commonly assigned to Intel Corporation of Santa Clara, Calif.

For purposes of disclosure, it is noted that the following patents/applications also claim priority to either the provisional application No. 60/080,501 or to the non-provisional application No. 09/209,828:

U.S. Pat. No. 6,408,029, issued Jun. 18, 2002, application Ser. No. 09/274,153, filed Mar. 22, 1999

U.S. Pat. No. 6,574,278, issued Jun. 3, 2003, application Ser. No. 09/274,151, filed Mar. 22, 1999

U.S. Pat. No. 7,046,734, issued May 16, 2006, application Ser. No. 10/339,016, filed Jan. 8, 2003 application Ser. No. 11/129,558, filed Dec. 1, 2005 application Ser. No. 09/274,152, filed Mar. 22, 1999.

BACKGROUND OF THE INVENTION

1. Field of the Invention

The present invention relates to the field of image processing and, in particular, to a method and apparatus for simplifying frame-based motion estimation.

2. Background Information

Over the years, the Motion Picture Experts Group (MPEG) has developed a number of standards for digitally encoding (also commonly referred to as compressing) audio and video data (e.g., the well-known MPEG-1, MPEG-2 and MPEG-4 standards). Recently, particular attention has been drawn to the MPEG-2 standard [ISO/IEC 13818-2:1996(E), "Information technology—Generic coding of moving pictures and associated audio information: Video", 1996], which generally describes a bit-stream syntax and decoding process for broadcast quality digitized video. The MPEG-2 standard is widely used in emerging state-of-the-art video delivery systems including digital versatile disk (DVD, sometimes referred to as digital video disk), direct broadcast satellite (DBS) (e.g., digital satellite television broadcasts) and high-definition television (HDTV).

The rising popularity of the MPEG-2 standard may well be attributed to its complex video compression technology that facilitates the broadcast quality video. Compression is basically a process by which the information content of an image or group of images (also referred to as a Group of Pictures, or GOP) is reduced by exploiting the spatial and temporal redundancy present in and among the image frames comprising the video signal. This exploitation is accomplished by analyzing the statistical predictability of the signal to identify and reduce the spatial and temporal redundancies, thereby reducing the amount of storage and bandwidth required for the compressed data. The MPEG-2 standard provides for efficient compression of both interlaced and progressive video content at bit rates ranging from 4 Mbps (for DVD applications) to 19 Mbps (for HDTV applications). FIG. 1 illustrates a block diagram of the complex elements of an example prior art MPEG-2 encoder for compressing video data.

As shown in the block diagram of FIG. 1, encoder 100 is generally comprised of an intra-frame encoder 102, an inter-frame encoder 104 a multiplexer 106 and a buffer 108, which controls the rate of broadcast of the compressed video data. Each of the intra-frame encoder 102 and inter-frame encoder 104 will be described in turn, below.

Simplistically speaking, compression by intra-frame compressor 102 may be thought of as a three-step process wherein spatial redundancy within a received video frame is identified, the frame is quantized and subsequently entropy encoded to reduce or eliminate the spatial redundancy in the encoded representation of the received frame. The identification of spatial redundancy within a frame is performed by transforming spatial amplitude data of the frame into a spatial frequency representation of the frame using the discrete cosine transform (DCT) function 110. The DCT function is performed on 8×8 pixel "blocks" of luminance (brightness) samples and the corresponding blocks of chrominance (color differential) samples of the two-dimensional image, generating a table of 64 DCT coefficients. The block of DCT coefficients is then compressed through Quantizer (Q) 112. Quantization is merely the process of reducing the number of bits required to represent each of the DCT coefficients. The quantizing "scale" used can be varied on macroblock (16×16 pixel) basis. The quantized DCT coefficients are then translated into a one-dimensional array for encoding 114 via variable length encoding and run length encoding. The order in which the quantized DCT coefficients are scanned into encoder 114 affects the efficiency of the encoding process. In general, two patterns for scanning the block of quantized DCT coefficients are recognized, the zigzag pattern and the alternate scan pattern, each of which are depicted in FIG. 2 as pattern 200 and 250, respectively. Those skilled in the art will appreciate that with prior art intra-frame compression such as that employed by intra-frame encoder 102, the zigzag scan pattern 200 is typically used as it produces long runs of zeroes, as the block of DCT coefficients are transformed run-length/value pairs for the variable length encoding process. The quantized, entropy encoded DCT coefficients along with the quantization tables are then sent to MUX 106 for broadcast and/or storage through rate control buffer 108.

Inter-frame compressor 104 reduces the temporal redundancies existing between frames in a group of pictures and is typically a complex process of motion estimation between frames and fields of the frames using reconstructed past and predicted future frames as a reference. Accordingly, inter-frame compressor 104 is depicted comprising motion estimator 116 which statistically computes motion vectors to anticipate scene changes between frames, anchor frame storage 118 to store reconstructed prior frame data (from the quantized DCT coefficients) and predicted frame storage 120 to store a predicted future frame based on motion vectors predicted by motion estimator 116 and current frame information. In addition, inter-frame compressor 104 is depicted comprising inverse quantizer 122, inverse DCT 124 and a summing node 126 to reconstruct the present or past frames for storage in anchor frame storage 118.

Those skilled in the art will appreciate that the MPEG-2 standard provides for three types of video frames and that the type of frame determines how the motion estimation for that frame is to be accomplished. The three frame types are Intra-frame coded (I-frame), Predictably encoded frames (P-frame) and bidirectionally interpolated frames (B-frame).

I-frames are encoded based only on the content within the frame itself and are typically used as reference and synchronization frames. That is, the separation between I-frames is used to denote Groups of Pictures (GOPs). P-frames are encoded based on the immediate past I- or P-frames (also referred to as anchors), and B-frames are encoded based on past or future I- and P-frames (thus the need for anchor and predicted frame storage 118 and 120, respectively). Predicting content based on frame data is graphically illustrated with reference to FIG. 3.

Turning to FIG. 3, a graphical representation of a typical GOP sequence of frames is presented 300 denoting an IBBPBBI sequence (commonly referred to as a GOP (6, 3) sequence by those skilled in the art). As shown in FIG. 3, encoding of I-frame 302 does not rely on any prior or future frame. Encoding of B-frame 304 utilizes information from past frames (e.g., I-frame 302) as well as future I and/or P-frames (e.g., P-frame 306).

If the frame sequence contains interlaced content, field prediction is also performed in calculating the motion vector. Simplistically speaking, frames are broken into even and odd fields, and the content of each field is predicted based on the information contained in both the odd and the even fields of the past and/or future frames (depending on the frame type, P or B-frames, respectively). More specifically, the content of P- and B-frames are predicted by analyzing the even and odd fields of past and/or future anchor frames. A typical field prediction process is depicted in FIG. 4.

With reference to FIG. 4, two frames 402 and 410 are depicted broken into their constituent even (404 and 412) and odd (406 and 414) fields, respectively. In this example, frame 402 is an I-frame, while frame 410 is a B-frame. In accordance with the prior art, the even field 412 of B-frame 410 is predicted from the even 404 and odd 406 field of the prior I-frame 402.

Those skilled in the art will appreciate that, although the computationally intensive video encoding associated with the MPEG-2 standard provides high resolution video imagery, its implementation typically requires one or more powerful, dedicated processor(s) (e.g., a microcontroller, an application specific integrated circuit (ASIC), a digital signal processor (DSP) and the like) to encode (or, conversely decode) MPEG-2 standard video data (e.g., to/from a DVD disk). Attempts to utilize the general purpose central processing unit (CPU) of a typical home computer for MPEG-2 processing has proven computationally prohibitive, as the MPEG-2 standard processing consumed nearly all of the computational resources of the general purpose CPU, thereby rendering the computer virtually useless for any other purpose. As a consequence, providing MPEG-2 standard video technology in a personal computer has heretofore required the addition of the costly dedicated video processors described above.

As a result of the cost and performance limitations commonly associated with real-time video encoding described above, the roll-out of MPEG-2 video multimedia capability in the home computing market has been slowed. Consequently, a need exists for a method and apparatus for encoding enhancements to facilitate real-time video encoding that is unencumbered by the deficiencies and limitations commonly associated with the prior art. An innovative solution to the problems commonly associated with the prior art is provided herein.

SUMMARY OF THE INVENTION

In accordance with one embodiment of the present invention, a method and apparatus for simplifying frame-based motion estimation is presented. In accordance with a first embodiment, motion estimation on a received stream of data comprising a plurality of bidirectionally interpolated frames (B-frame) and a plurality of anchor frames is performed by unidirectionally predicting content of each of the plurality of B-frames from the temporally closest anchor frame.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate blocks, however, those skilled in the art will appreciate that such separately delineated blocks should not be construed as necessarily conferring an order dependency in their performance.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Those skilled in the art will appreciate from the description to follow that the innovative encoder described herein is comprised of a number of innovative aspects, each of which provide increased performance without significant degradation to the integrity of the encoded data over prior art MPEG-2 video encoders. For ease of explanation, each of the innovative aspects of intra-frame encoding and inter-frame encoding processes of the present invention will be described in turn, and as a constituent component of the innovative encoder of the present invention. This is not to say, however, that all of the innovative aspects described herein must be present in order to practice the present invention. Indeed, a number of alternative embodiments will be presented depicting various levels of complexity incorporating one or more aspects of the present invention. Thus, those skilled in the art will appreciate from the description to follow that any of a number of embodiments of the present invention may be practiced without departing from the spirit and scope of the present invention.

Intra-frame Encoding

Figure 1:
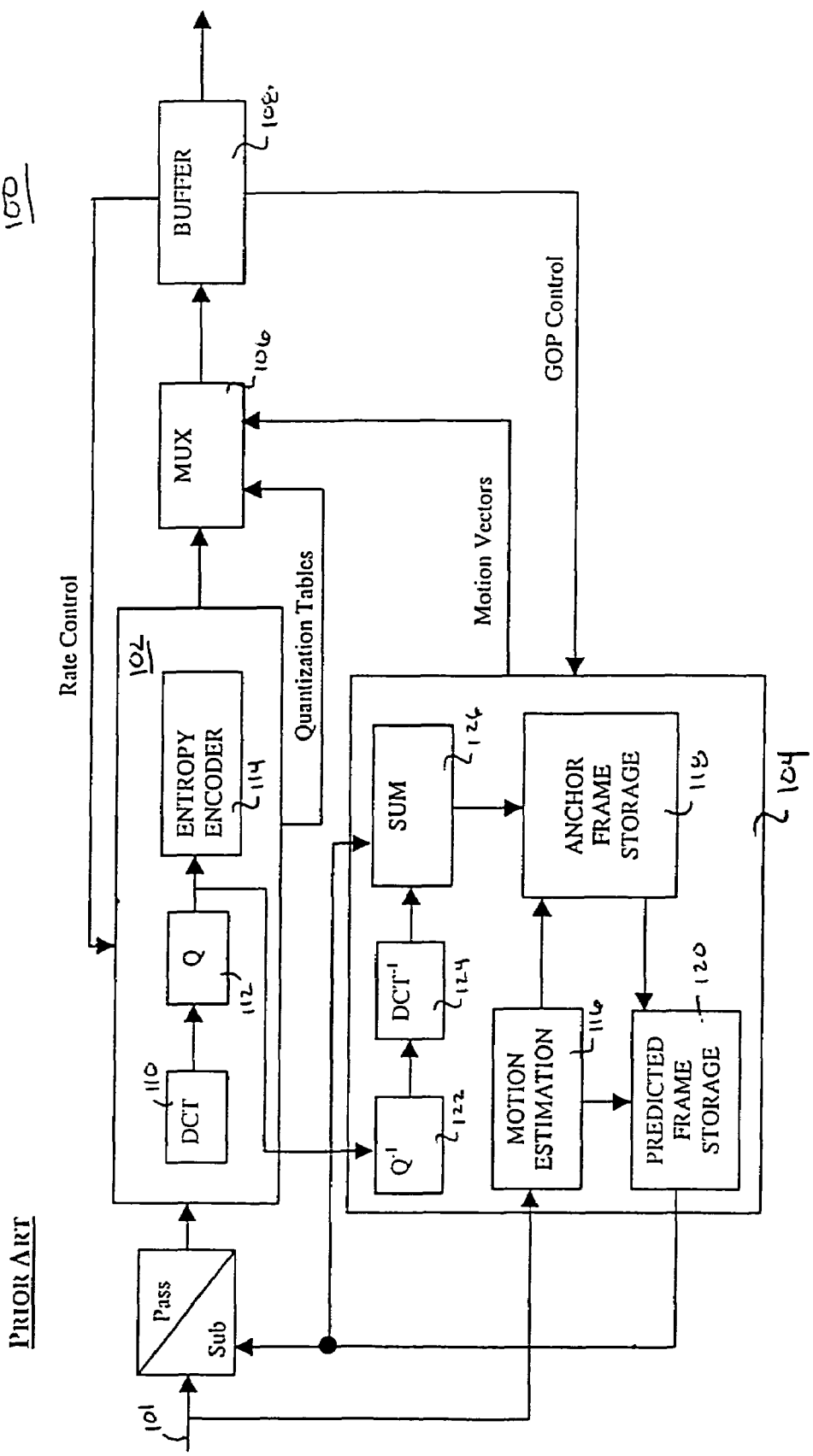
FIG. 1 is a block diagram illustration of a typical prior art data encoder to encode data in accordance with the MPEG-2 standard.
Figure 2:
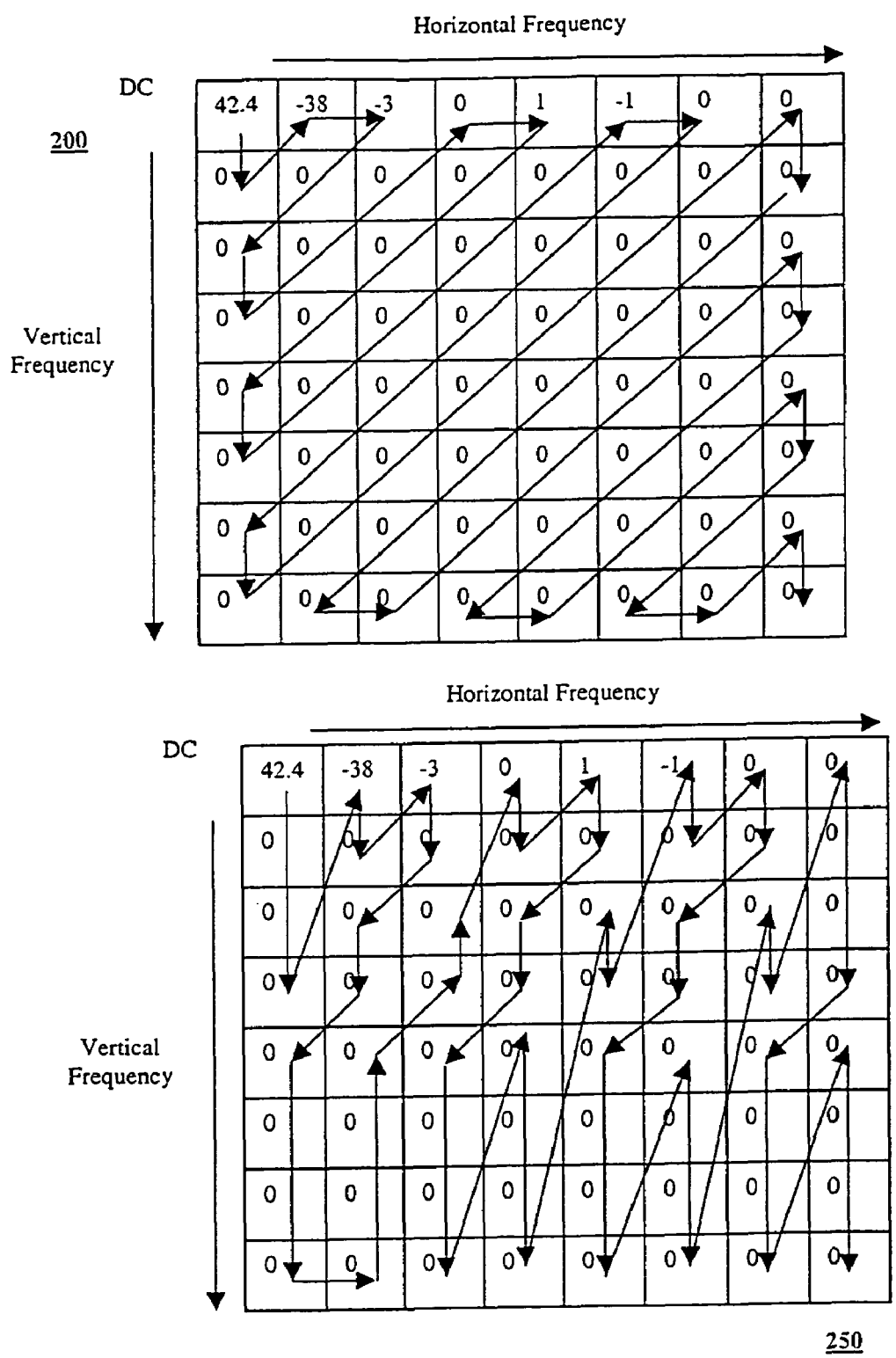
FIG. 2 is a graphical representation of a block of data being encoded in accordance with a zigzag scan pattern, and a block of data being encoded in accordance with an alternate scan pattern, in accordance with one embodiment of the present invention.
Figure 3:
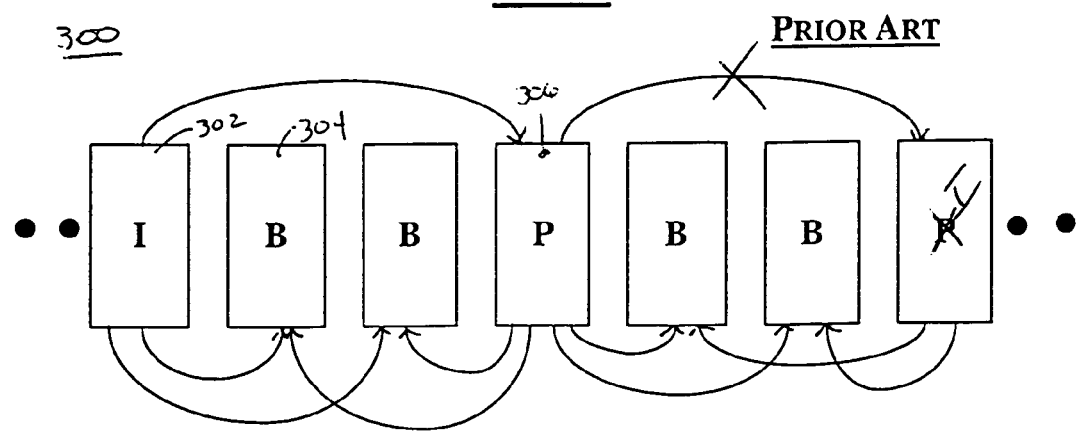
FIG. 3 is a graphical representation of a group of pictures denoting the coding dependencies for motion estimation, in accordance with prior art encoders.
Figure 4:
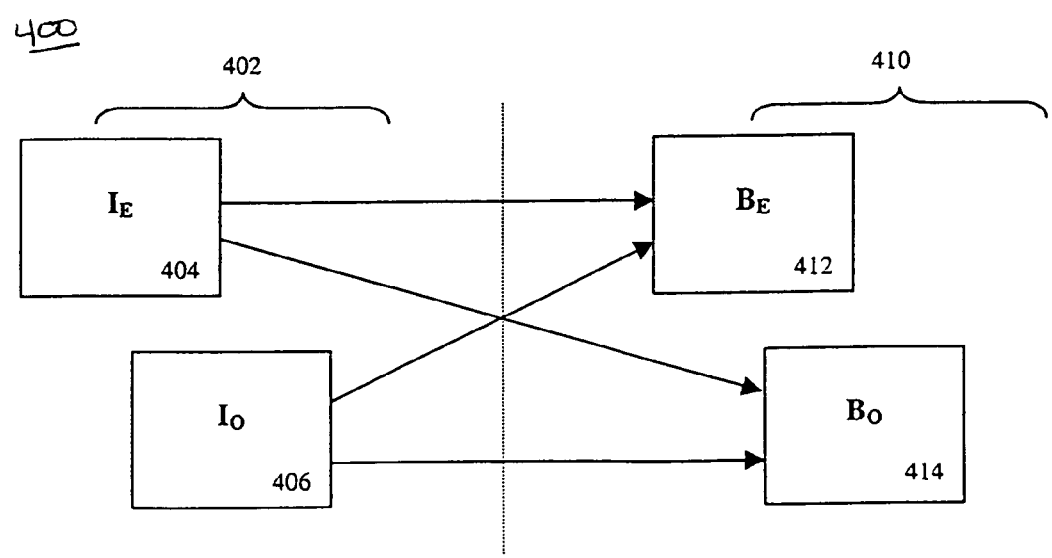
FIG. 4 is a graphical representation of field prediction dependencies between frames of a group of pictures, in accordance with prior art encoders.
Figure 5:
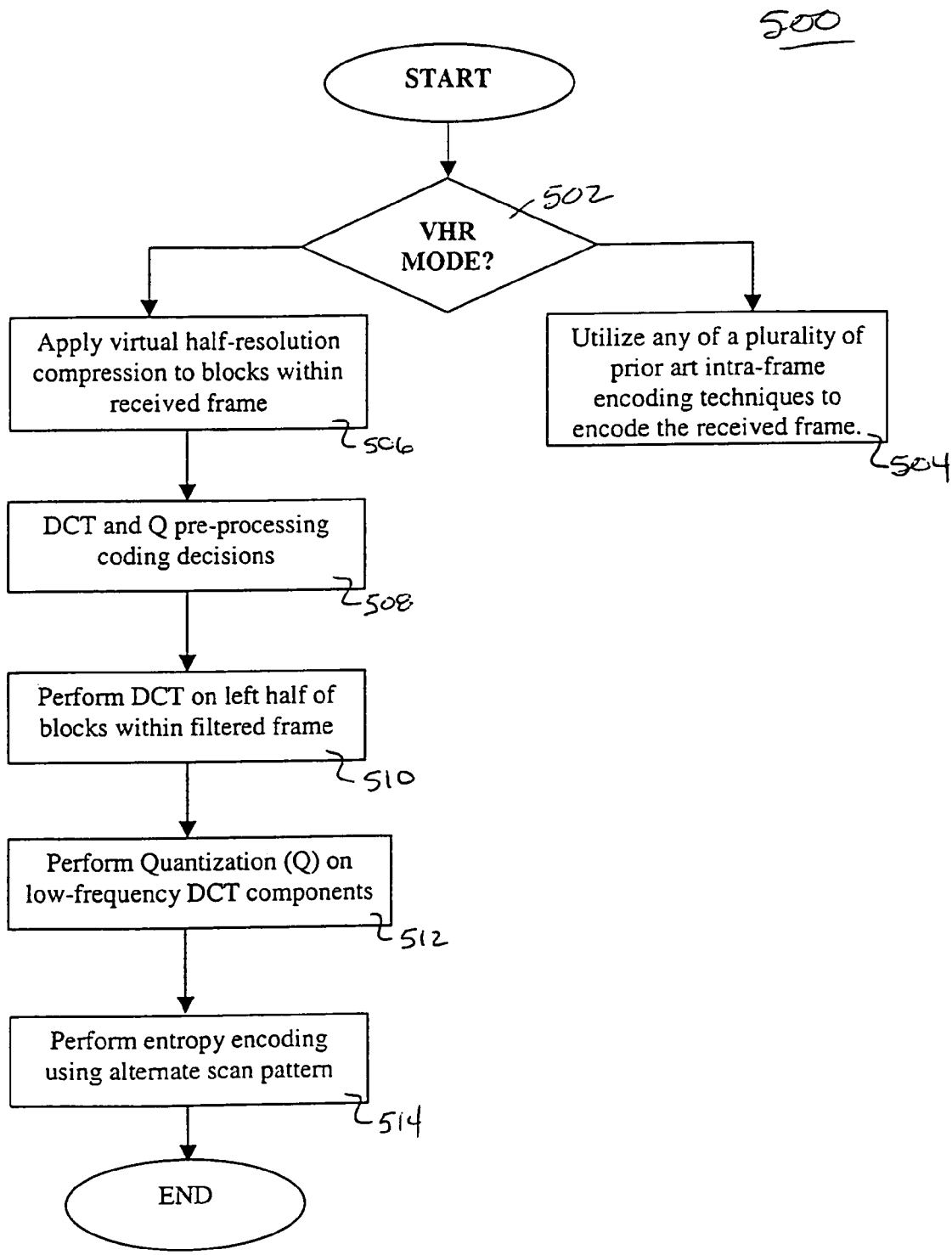
FIG. 5 is flow chart illustrating an example method for intra-frame encoding in accordance with the teachings of the present invention.

Turning to FIG. 5, a flow chart illustrating an example method for performing intra-frame compression and encoding in accordance with the teachings of the present invention is presented. In accordance the teachings of the present invention, method 500 begins with, in step 502, a determination of whether virtual half-resolution (VHR) downconversion is to be performed, in accordance with a first aspect of the present invention. If VHR downconversion is not to be performed, the innovative encoder of the present invention will continue with prior art intra-frame compression, while still employing the innovative inter-frame compression aspects of the present invention to be described more fully below, step 504.

Figure 6:
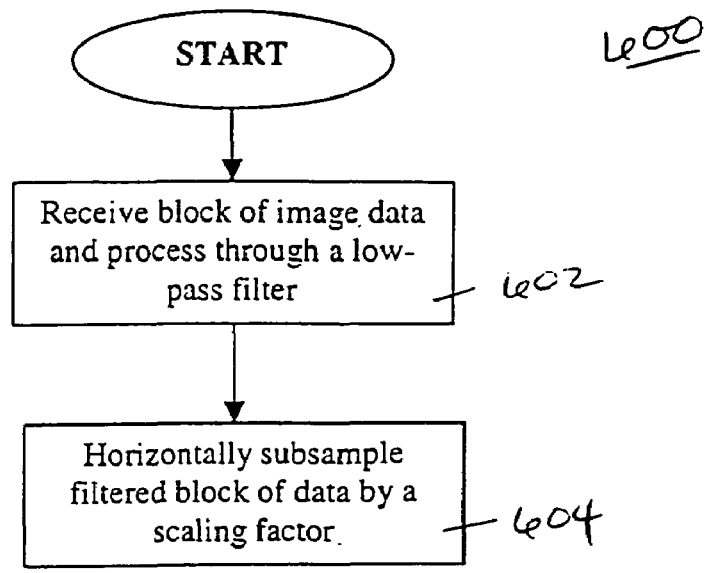
FIG. 6 is a flow chart illustrating a method of performing virtual half-resolution (VHR) filtering in accordance with one aspect of the present invention.
Figure 7:
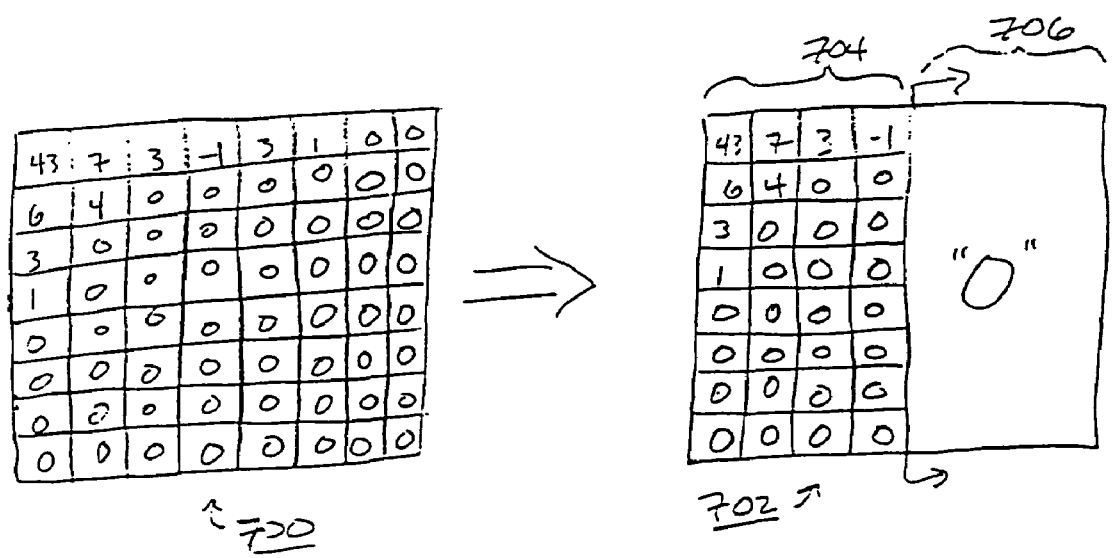
FIG. 7 is a graphical representation of a received block of data before and after application of the VHR filter of the present invention, in accordance with the teachings of the present invention.
Figure 8:
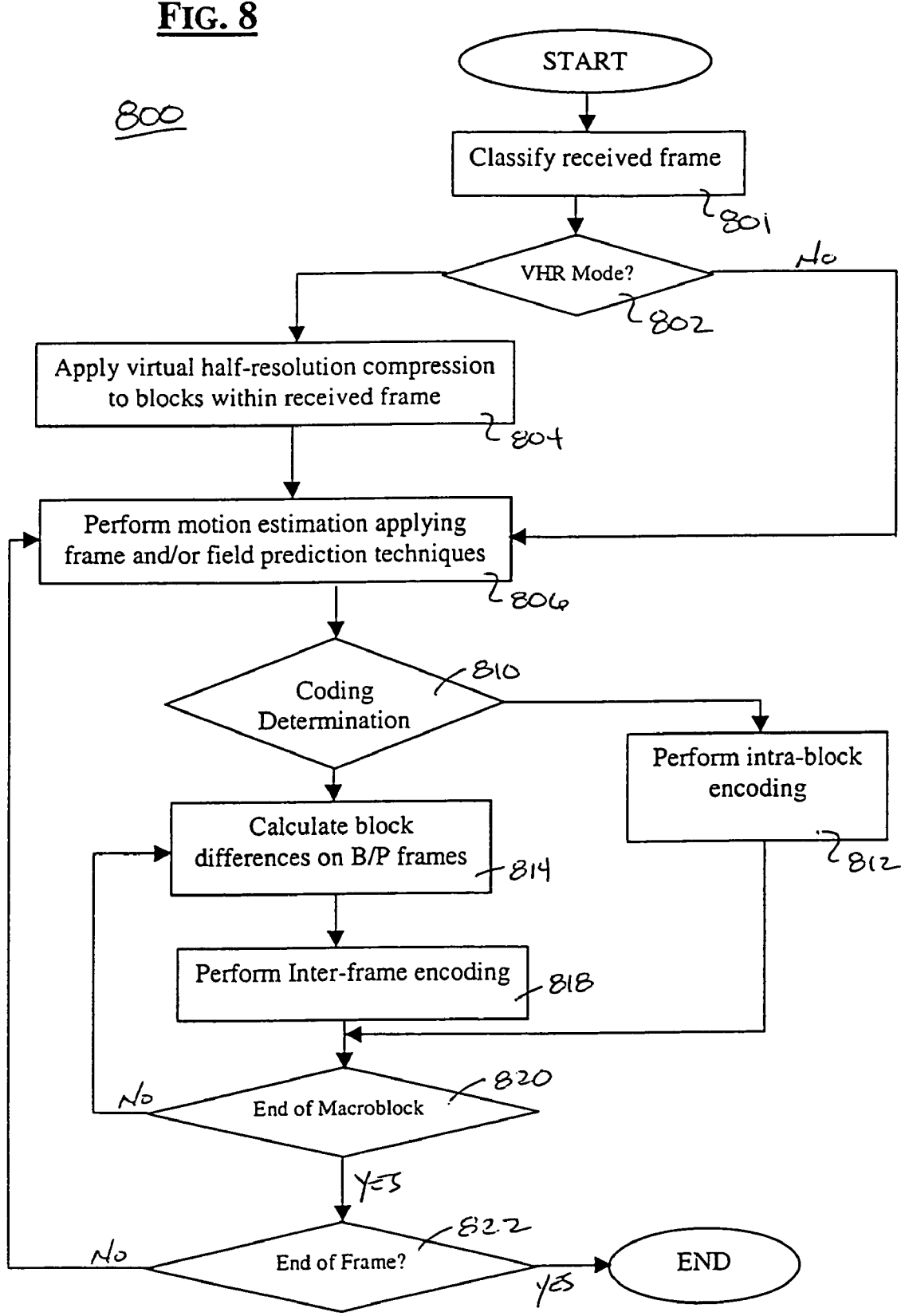
FIG. 8 is a flow chart of an example method of performing inter-frame encoding, in accordance with the teachings of the present invention.

If, however, it is determined in step 502 that VHR downconversion is to be performed, the process continues with step 506 wherein a low-pass filter is applied to the received frame in step 506 and the frame is subsampled horizontally. In one embodiment of the present invention, for example, the frame is subsampled horizontally by a factor of two (2), which eliminates one-half of the frame of data. Turning briefly to FIGS. 6 and 7, one example embodiment of a method for performing VHR downconversion and a block of DCT coefficient data before (900) and after (702) VHR downconversion is presented. In accordance with one aspect of the present invention, VHR downconversion begins with step 602 wherein a block of data 700 (e.g., 8×8 block of DCT coefficients) is received and processed through a low-pass filter. In step 604, the filtered block of data is horizontally subsampled by some scaling factor. In one embodiment, the filtered block of data is horizontally subsampled by a factor of two (2), rendering the right-half of the block (706), null (i.e., full of zeroes). More specifically, in accordance with the teachings of the present invention, VHR downconversion is performed by application of a horizontal low-pass filter, which is applied to both the luminance and chrominance data. In one embodiment of the present invention, a [1 2 1] filter kernal is used in step 602. For example, in one embodiment, the following filter is used:

$$h(n)=0.25[\delta(n-1)+2\delta(n)+\delta(n+1)] \quad (1)$$

In one example software implementation of the present invention, suitable for execution by an Intel® Architecture processor, the following simplified version of equation (1) may be used, utilizing the pavg instruction:

$$y(n)=PAVG(x(n),PAVG(x(n-1),x(n+1))) \quad (2)$$

Thus, instead of subsequently encoding the received data with a traditional 8×8 DCT and then realizing that most of the coefficients in the right half of the block, i.e., the high-frequency spatial components, are zero as a result of the foregoing filter, the block is horizontally subsampled in step 604. In one embodiment, for example, the received blocks are subsampled by a factor of two (2) horizontally. This results in macroblocks of 8×16 and blocks of 4×8. That is, the horizontal 8-pixel DCT is replaced with a modified 4-pixel DCT. The resulting coefficients of the normal 4-pixel DCT are modified by scaling them by the square root of two (sqrt (2)) to accommodate the conversion to an 8-pixel DCT. Consequently, to an MPEG-2 compliant decoder, the VHR compressed data looks identical to full-resolution encoded MPEG-2 data. When decoded with an MPEG-2 compliant decoder, the visual effect of application of the VHR downconversion of FIG. 6 is negligible, while realizing up to a 2× improvement in data throughput.

Once the VHR downconversion has been completed on each block of the received frame in step 506, discrete cosine tranform (DCT) and quantization pre-processing is performed on the VHR downconverted frame, step 508. More specifically, in accordance with one embodiment of the present invention, the pre-processing consists of DCT type selection and macroblock quantization selection.

For data streams comprising interlaced video, the first step in the encoding pipeline is deciding between frame and field DCT. To improve compression efficiency, selection of the DCT type which yields smaller vertical high-frequency coefficients is preferable. In one embodiment present invention, the "vertical activity" is measured by comparing the activity of adjacent lines for both frame and field macroblocks. In one embodiment, vertical frame activity is measured by summing the absolute difference of spatial amplitudes over pairs of adjacent frame lines over a macroblock (i.e., VHR mode 8×16; non-VHR mode 16×16). In one embodiment, a psad operation may be used to sum the absolute difference of pairs and, thus, vertical frame activity is calculated by summing the result of a psad operation over pairs of adjacent frame lines over the macroblock, e.g., $$\text{frame\_activity} = \sum_{n=0}^{7} PSAD(\text{line}_{2n}, \text{line}_{2n+1}) \quad (3)$$

Similarly, the vertical field activity for both fields is calculated by summing the absolute difference over pairs of adjacent field lines (even numbered lines contain the top field and the odd numbered lines contain the bottom field). Again, the psad operation may well be employed, e.g., $$\text{field\_activity} = \sum_{n=0}^{3} PSAD(\text{line}_{2n}, \text{line}_{2n+1}) \sum_{m=0}^{3} PSAD(\text{line}_{2m+1}, \text{line}_{2n+3}) \quad (4)$$

Low activity values indicate small vertical frequency magnitudes, while the converse is true for high activity values. In accordance with one embodiment of the present invention, the measure which provides the lowest vertical AC coefficients are selected to improve the efficiency of subsequent encoding processes.

In one embodiment of the present invention, the quantizer scale is selected based, at least in part, on how highly correlated the data is within each of the blocks of the macroblock. In one embodiment, if the block data is highly correlated, a lower (finer) quantization scale is used. If, however, the block data is uncorrelated (e.g., highly textured regions), a larger quantizer scale is utilized. This decision is based, in part, on the theory that the human visual system is not particularly sensitive to degenerative artifacts in highly textured regions. To estimate the activity within a macroblock, a measure of the horizontal activity is combined with a measure of the vertical activity value obtained from the DCT Type Selection (above). In one embodiment, the horizontal activity is measured using a first-order approximation of the correlation between adjacent pixels using the psad operation:

$$\text{horizontal\_activity} = \Sigma PSAD(\text{line}[n]\&0\text{x}00\textit{ffffffff}, \text{line}[n]\!>\!>\!8) \quad (5)$$

The total activity, which is the sum of the horizontal and vertical activities, then is used to select the macroblock quantizer scale to be applied.

Once the pre-processing of step 508 is completed, the VHR downconverted frame is discrete cosine transformed into the frequency domain, step 510. As provided above, the DCT is but one means of transforming the spatial amplitude data of a frame to a spatial frequency representation. Within the context of the present invention, any of a number of known techniques for performing DCT may well be employed. However, in the instance where the VHR filter has been employed, the transformation to the frequency domain need only be performed on the lower frequency 4×8 pixels of the block (704) (i.e., the left half of the 8×8 block). In one embodiment, the well known fast DCT-SQ algorithm is utilized for eight and four pixel DCT's.

With continued reference to FIG. 5, the downconverted, DCT coefficients resulting from the DCT process of step 508 are quantized in step 512, before entropy encoding in block 514. In accordance with one embodiment of the present invention, only the left-side, i.e., the low-frequency components, of the DCT transformed block are quantized, thereby increasing throughput by a factor of two.

As described above, the entropy encoding process 514 translates the two-dimensional block of quantized DCT coefficients into a one dimensional representation. Since the quantized DCT coefficients in the right half of the 8×8 block are always zero, as a result of the VHR downconversion, the alternate scan pattern 250 (described above) and run length encoding provides the most efficient entropy encoding process. That is because application of the alternate scan pattern 250 guarantees that almost the entire left half of the block is traversed before traversing the right half. In one embodiment, the run-length encoding process compresses the quantized data further into a form of (run_of_zeroes, next non-zero value). For example, a sequence of "070003000002" would be encoded as (1, 7), (3, 3), (5, 2) and so on. As provided above, the goal is to maximize the run of zeroes for maximum compression efficiency.

Those skilled in the art will appreciate, based on the foregoing, that the VHR method of FIG. 6 facilitates up to a 2× improvement in intra-frame compression by replacing the right-half of the received blocks with zeroes, thereby eliminating the need for DCT and quantization of nearly 50% of the received data, while improving encoding efficiency. Thus, those skilled in the art will appreciate that the VHR aspect of the present invention provides for high-quality video while increasing data throughput through the innovative encoder of the present invention.

Inter-frame Compression/Encoding

Having described the innovative intra-frame compression process above with reference to FIGS. 5 through 7, the innovative inter-frame compression process will now be described with reference to FIGS. 8 through 12. Those skilled in the art will appreciate, that the innovative frame prediction and field prediction motion estimation aspects of the present invention, to be described more fully below, facilitate the additional processing speed improvements associated with the present invention. More specifically, disclosed herein is an innovative temporally constrained, unidirectional interpolation of bidirectional interpolated frames, and the even-parity field prediction, each of which will be described in greater detail below. We begin with reference to FIG. 8 which presents an example method for removing temporal redundancies between frames (i.e., inter-frame compression) is presented, in accordance with one embodiment of the present invention.

As shown, inter-frame compression process 800 begins upon the receipt of one or more frames of video. In the instance where more than one frame of video is received, they are classified in step 801 as either I-, B-, or P-frames, as described above. In accordance with one embodiment of the present invention, the assignment of frame type follows a predetermined sequential pattern to achieve the desired GOP sequence, to be described more fully below. In an alternate embodiment, the received frames are buffered and analyzed to determine whether a scene change occurs within any of the buffered frames. If so, the scene change will be placed between two inter-frame encoded frames, e.g., two B-frames, to maximize coding efficiencies and motion estimation of the B-frames (to be described more fully below).

In accordance with one aspect of the present invention, the innovative encoding process of the present invention utilizes a constrained GOP sequence of GOP (3, 3), i.e., 3 frames separating I-frames, with a maximum of 3 frames separating anchor frames. By limiting the inter-frame encoding to the GOP structure identified, the innovative encoder of the present invention provides fast access to particularly fine quantities of video (e.g., facilitating editing, postproduction, etc.). Moreover, the constrained GOP structure of the present invention facilitates motion estimation by limiting the number of frames which must undergo motion estimation.

In step 802, a decision is made of whether VHR downconversion is to be performed. If not, the process continues with step 806 offering the innovative frame-prediction and field prediction aspects of the inter-frame compression process. If VHR downconversion is to be performed, the VHR filter (see, e.g., FIG. 6) is applied in step 804, and the process continues with motion estimation in step 806. Those skilled in the art will appreciate, based on the foregoing, that the VHR method of FIG. 6 facilitates up to a 2× improvement in inter-frame compression by replacing the right-half of the received blocks with zeroes, thereby eliminating the need for DCT and quantization of nearly 50% of the received data, while improving encoding efficiency. Thus, those skilled in the art will appreciate that the VHR aspect of the present invention provides for high-quality video, while reducing encoding complexity thereby facilitating the real-time encoder of the present invention.

The motion estimation step 806 calculates motion vectors which are stored/broadcast along with the compressed video data to facilitate broadcast quality decoding. As described above, motion estimation may well be performed on a frame- or field-basis. In accordance with one aspect of the present invention, the motion estimation of step 806 is comprised of an innovative frame-based motion estimation technique and/or an innovative even-parity field prediction motion estimation technique. With reference to the first of these two aspects of the present invention, an innovative unidirectional interpolated B-frame prediction technique is described more fully with reference to FIGS. 9 and 10.

Figure 9:
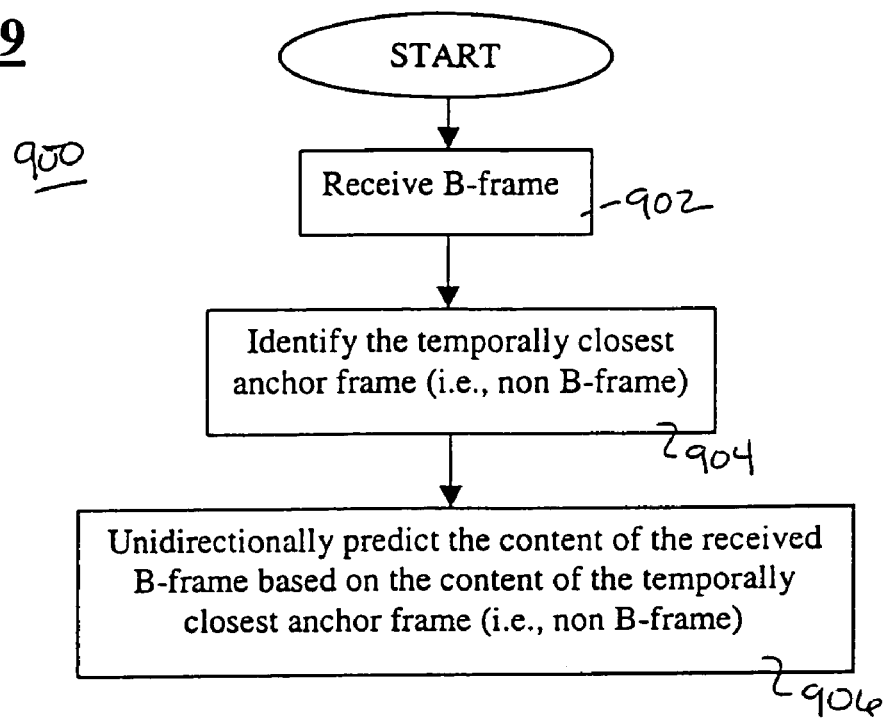
FIG. 9 is a flow chart of an example method for performing unidirectional motion estimation on bi-directionally predicted frames, in accordance with another aspect of the present invention.

Turning briefly to FIG. 9 an innovative method for performing temporally constrained, unidirectional B-frame motion estimation 900 is presented. In accordance with the illustrated example embodiment, the method begins upon receipt of a B-frame which is to be inter-frame encoded, step 902. In step 904, a single anchor frame is selected from which the content of the B-frame is to be predicted. In accordance with one embodiment of the present invention, the temporally closest anchor frame, whether preceding or superseding the B-frame is selected. In step 906, in contradiction to the well established method for predicting B-frame content, the content of the B-frame is unidirectionally interpolated from the content of the above identified temporally closest anchor frame, in accordance with one aspect of the present invention. More specifically, in accordance with one embodiment of the present invention, the content of the B-frame is unidirectionally interpolated using the content of the temporally closest anchor frame and a motion vector calculated based on the temporally closest anchor frame. In one embodiment, the motion vector is the sum of absolute differences (SAD) of the activity within the anchor frame, e.g., within each scan line of the anchor frame.

Figure 10:
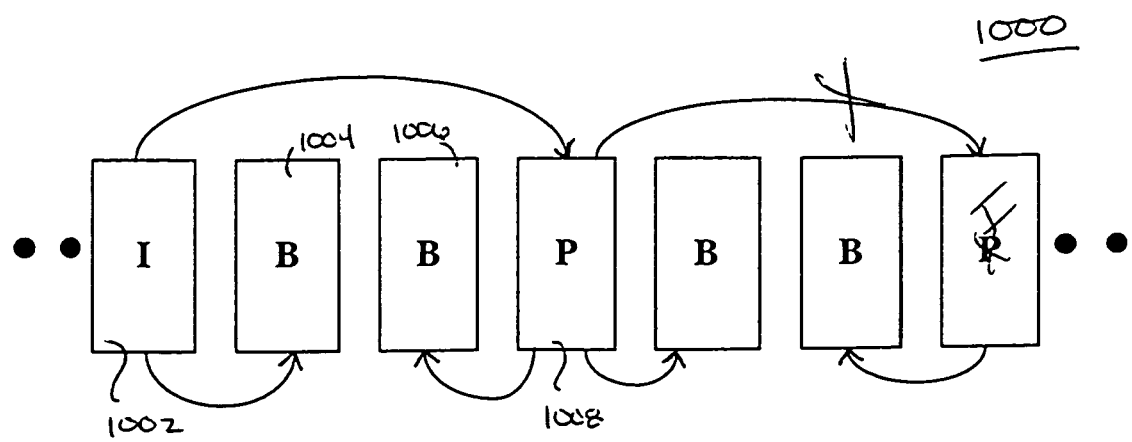
FIG. 10 is a graphical representation of motion estimation for a group of pictures in accordance with the teachings of the present invention.

Graphically, the temporally constrained, unidirectional interpolation of a B-frame is presented with reference to FIG. 10. As shown in FIG. 10, rather than bidirectionally interpolating the content of B-frame 1004 from past and future anchor frames, the content of B-frame 1004 is unidirectionally interpolated by the closest anchor frame, i.e., I-frame 1002, in accordance with one aspect of the present invention. Similarly, B-frame 1006 is unidirectionally interpolated from the temporally closest anchor frame, P-frame 1008, in accordance with this aspect of the present invention. As shown, inter-frame encoding of P-frame 1008 is premised on the nearest past anchor frame, in this example, I-frame 1002.

Although contrary to the well established practice for predicting B-frame content, the innovative temporally constrained, unidirectional B-frame technique of FIG. 9 has been empirically shown to provide substantially the same quality decoded picture as video encoded using the standard B-frame encoding process, while using only a fraction of the normal computational requirements. Accordingly, those skilled in the art will appreciate, based on the foregoing, that this aspect of the present invention, namely, the temporally constrained unidirectional interpolation of B-frames greatly reduces the computation complexity of inter-frame compression, thereby facilitating greater encoding throughput with minimal degredation to the quality of the encoded data.

In addition to the innovative frame-based motion estimation technique described above with reference to FIGS. 9 and 10, innovative motion estimation process 806 also includes an enhanced field prediction process, namely, an innovative even-parity field prediction motion estimation technique. In accordance with this aspect of the present invention, attention is drawn to FIGS. 11 and 12, wherein a method and graphical representation for performing even-parity field motion estimation is presented.

Figure 11:
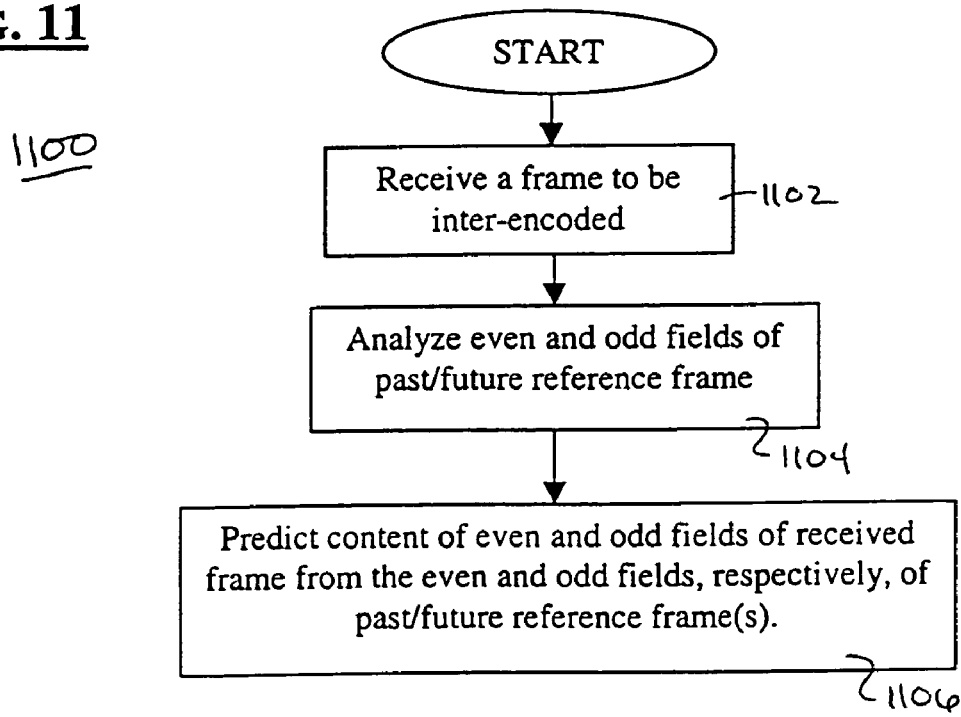
FIG. 11 is a flow chart illustrating an example method for performing even-parity field prediction in accordance with another aspect of the present invention.

Turning to FIG. 11, an example method for performing even-parity field prediction is presented, in accordance with one aspect of the present invention. As shown in FIG. 11, the method begins upon the receipt of a subject frame of interlaced (or progressive) video which is to be inter-frame encoded, step 1102. In step 1104, each of a plurality of fields of a past or future (i.e., the temporally closest anchor frame, as described above) anchor frame are analyzed to predict the content of corresponding fields in the subject frame, step 1106. In one embodiment, the even-field of the anchor frame is used to predict the even-field of a subject frame, while an odd-field of an anchor frame is used to predict the odd-field of the subject frame. In one embodiment, the odd-field of an anchor frame is used to predict the even-field of a subject frame, while the even-field of the anchor frame is used to predict the odd-field of the subject frame. In one embodiment, the content of the even- or odd-field of the anchor frame is scaled by a motion vector to predict the content of corresponding even- or odd-fields of the subject frame. In one embodiment, the motion vector is computed by measuring the sum of absolute differences of the activity within the respective field of the anchor frame.

Figure 12:
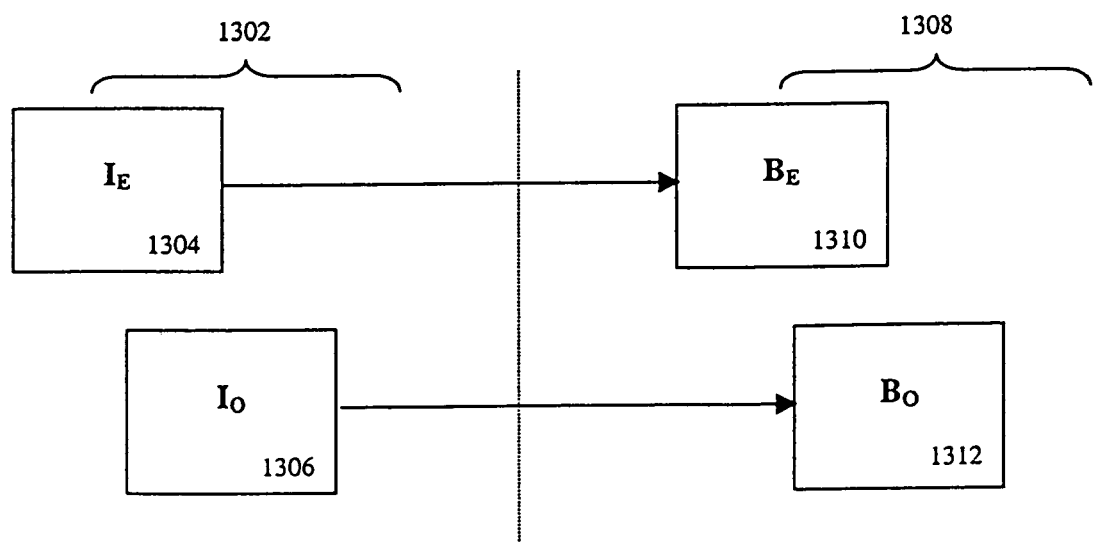
FIG. 12 is a graphical representation of motion estimation using even-parity field prediction in accordance with the teachings of the present invention.

Graphically, the even-parity field prediction process is presented with reference to FIG. 12. As shown in FIG. 12, two frames are presented an I-frame 1302 and a subsequent B-frame 1308. In accordance with the even-parity field prediction process of the present invention, the even field 1310 of B-frame 1308 is predicted from the corresponding even field 1304 of the temporally closest reference frame, i.e., I-frame 1302 in this example. Similarly, the odd field 1312 of B-frame 1308 is inter-frame encoded based on the content of the odd field 1306 of reference frame 1302. In an alternate embodiment, odd-parity field prediction may well be used, wherein the even field of the subject frame is inter-frame encoded based on the content of the odd field of the reference frame, and vice versa.

Although contrary to the well established practice of field prediction used to encode video data, the innovative even-parity field prediction technique has been empirically shown to encode data which, when decoded in accordance with the MPEG-2 standard, provides substantially similar results to the comprehensive field prediction technique of the prior art.

Accordingly, those skilled in the art will appreciate that the innovative frame and field prediction techniques presented above, greatly reduce the complexity of motion estimation, facilitating greater encoder throughput while retaining the required and expected video integrity of the MPEG-2 encoded data.

In one embodiment, except for the innovative frame and field prediction constraints described above, motion estimation in accordance with prior art MPEG-2 encoders is performed, albeit at a greatly increased rate due to the innovative constraints. In alternate embodiments, process enhancements to the motion estimation process can be made by multi-resolution decomposition (also referred to as hierarchical decomposition) of the received video into two or more levels, and performing coarse motion estimation on certain levels, while performing fine motion estimation on other levels.

Once motion estimation step 806 is complete, coding decisions of whether intra- or inter-frame encoding is required are performed, step 810. In accordance with one embodiment of the present invention, the vertical and horizontal activity measures described above are utilized in step 806 to determine whether intra- or inter-frame encoding is more suitable. In one embodiment of the present invention, intra-frame encoding is performed per the innovative method of FIG. 5, step 812. If inter-frame encoding is to be performed (i.e., B- or P-frames), the block difference is calculated, step 814. The block difference is the residual between the original and motion compensated blocks, for both the luminance and chrominance data in the block. In one embodiment, this residual is calculated only over even-numbered lines to reduce computational complexity.

Once the block residual is calculated in step 814, a determination of whether the block is empty can be made, step 816. If so, further determinations of whether the end of the macro-block or frame has been reached in steps 820 and 822, before the encoding process is complete. If, however, the block is not empty, the block is inter-frame encoded (DCT, quantization, entropy encoding, etc.) per FIG. 5 is performed in step 818.

Figure 13:
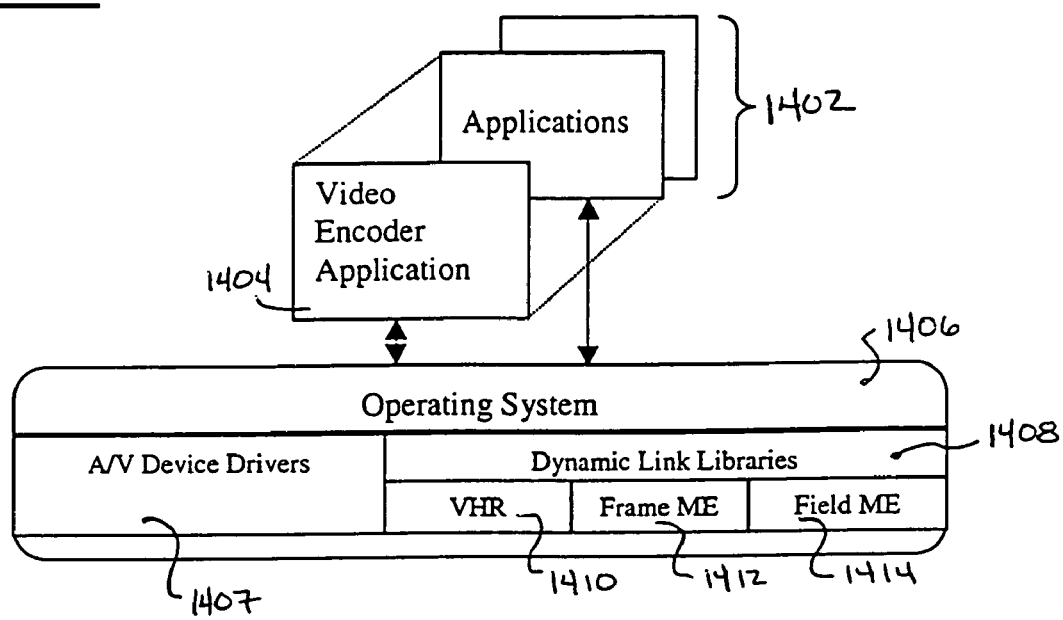
FIG. 13 is a block diagram of an example software architecture incorporating the teachings of the present invention, in accordance with one embodiment of the present invention.
Figure 15:
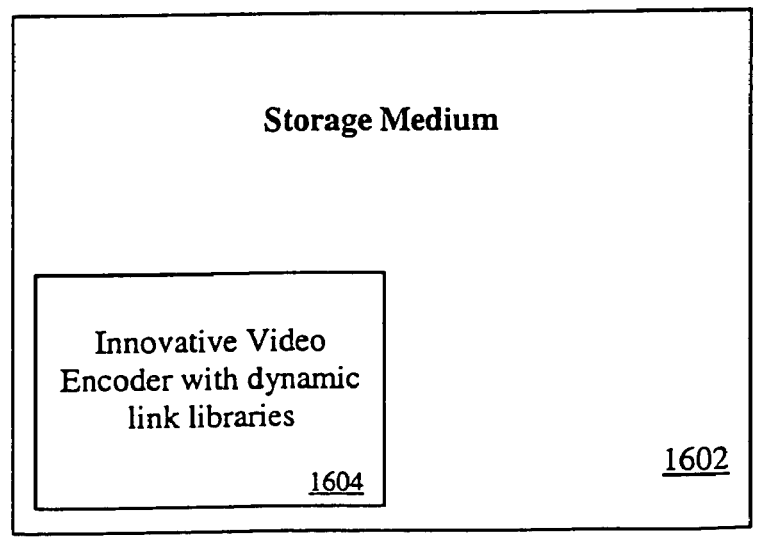
FIG. 15 is a block diagram of an example storage medium having stored therein a plurality of machine executable instruction which, when executed, implement the teachings of the present invention, in accordance with one embodiment of the present invention.
Figure 14:
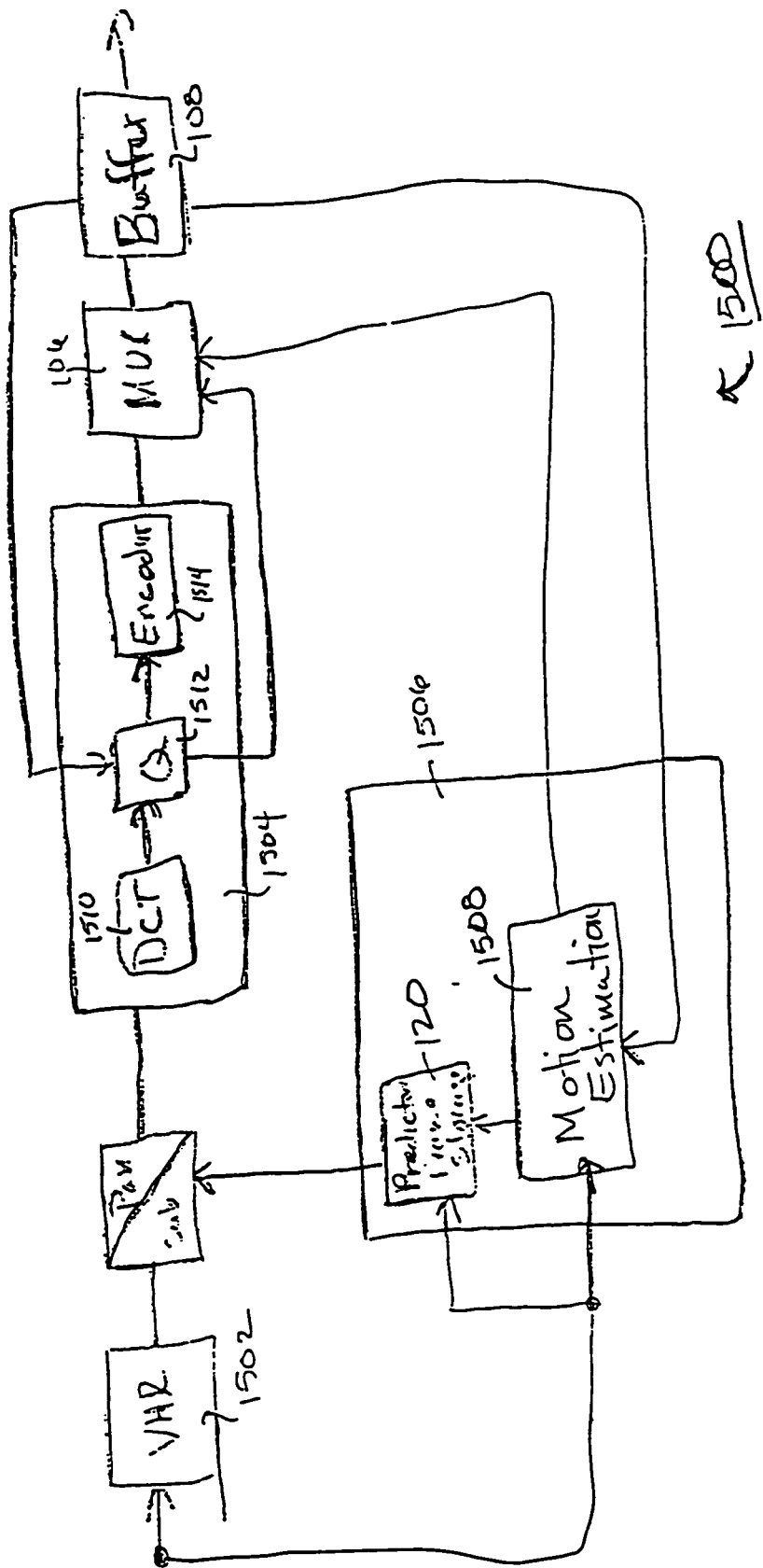
FIG. 14 is a block diagram of an example software architecture incorporating the teachings of the present invention, in accordance with an alternate embodiment of the present invention.

Having described the innovative intra-frame and inter-frame compression and encoding techniques of the present invention, above, some alternate embodiments for the present invention will be presented with reference to FIGS. 13 through 15.

Turning to FIG. 13, a block diagram of an example software architecture 1400 implemented on an electronic appliance incorporating the teachings of the present invention is presented, in accordance with one embodiment of the present invention. In accordance with the illustrated example embodiment of FIG. 13, software architecture 1400 is shown comprising a plurality of applications 1402 including a video encoder application 1404, operating system 1406 with associated device drivers (1407) and dynamic link libraries (DLL) 1406, cooperatively coupled as depicted. In accordance with one embodiment of the present invention, the innovative elements of intra-frame compressor/encoder 500 and inter-frame compressor/encoder 800 are embodied within distinct DLL's 1408, which can be called by any of a number of applications 1402, including the video encoder application 1404.

In accordance with this example embodiment, DLL's 1408 include a VHR filter DLL 1410, a frame motion estimation DLL 1412 and, and a field motion estimation DLL 1414 each incorporating the teachings of the present invention described above with reference to FIGS. 5–12. In an alternate embodiment, video encoder application 1404 includes the innovative aspects of intra-frame encoder 500 and inter-frame encoder 800, described above, as subroutines within the application itself.

Whether resident within a stand-alone application (e.g., video encoder 1404) or as a number of discrete DLL's 1408 which are called when required, the innovative aspects of the present invention are embodied as a plurality of executable instructions which, when executed by an appropriate processor/controller, implement the methods of FIGS. 5 and/or 8 and their referenced progeny enabling the innovative MPEG-2 encoder technique presented above.

In accordance with the teachings of the present invention, VHR filter DLL 1410 downconverts the received block of data by a factor of two by replacing the data in the right half of the received block with all zeroes (see, e.g., FIG. 7). The frame motion estimation DLL 1412 employs the innovative temporally constrained unidirectionally interpolated B-frame technique described above with reference to FIG. 9. The field motion estimation DLL 1414 employs the innovative even-parity field prediction technique described above with reference to FIG. 11. In alternate embodiments of the present invention, one or more of the innovative aspects of the present invention are provided within the DLL library 1408 or within video encoder application 1404 facilitating the use of encoders with different levels of computational complexity with minimal differentiation in the integrity of the encoded data.

As depicted herein, applications 1402 are intended to represent any of a number of specialty applications known in the art which are executable by an electronic appliance. Similarly, except for the teachings of the present invention, operating system 1406 is also intended to represent any of a number of alternative general operating systems and device drivers known in the art. Those skilled in the art will appreciate that the execution of operating system 1406 is initiated from within a basic input/output system (BIOS) (not shown). Operating system 1406 is a general software service which provides an interface between applications 1402, a video encoder application 1404 and, the DLL's 1408 incorporating the teachings of the present invention, described above. According to one embodiment of the present invention, operating system 912 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, the UNIX operating system, available from Santa Cruz Operations of Santa Cruz, Calif., the Be operating system from Be, Inc. of Menlo Park, Calif., and the LINUX operating system.

Turning to FIG. 14, a block diagram of an example data encoder incorporating the teachings of the present invention is presented. In accordance with the teachings of the present invention, encoder 1500 is depicted comprising VHR filter 1502, intra-frame encoder 1504 and inter-frame encoder 1506, in addition to multiplexer 106 and rate control buffer 108, each cooperatively coupled as depicted. Except for the teachings of the present invention, encoder 1500 is typical of prior art encoders. In particular, VHR filter 1502 is a low-pass filter that effectively replaces the right-half of a received block of data with all zeroes (see, e.g., FIG. 7).

Accordingly, the computation resources of the DCT and Quantization phases of frame encoder 1504 are greatly reduced, with minimal impact to decoded video image. In accordance with another aspect of the present invention stemming from the VHR filter 1504, entropy encoder 1514 employs run-length encoding utilizing the alternate scan pattern, as described above.

In addition to the innovative encoding techniques described above, the inter-frame encoder 1506 utilizes a computationally efficient motion estimator 1508, which employs the temporally constrained unidirectional B-frame encoding and the even-parity field encoding techniques described above. Moreover the innovative inter-frame encoder 1506 of the present invention does not rely on reconstructed past frames as a reference, but rather utilizes the original frame, thereby eliminating the need for the reconstructing circuitry (e.g., DCT (1510), Q (1512) and Summing stage) and additional storage (120) typical of prior art encoders. In one embodiment, innovative encoder 1500 is implemented on a video board accessory board of a typical home computer system, or as a constituent member of a special purpose video processing station.

In accordance with another embodiment of the present invention, the innovative encoding techniques of the present invention are embodied in software. Accordingly, FIG. 15 illustrates an example storage medium 1602 having stored thereon machine executable instructions 1604 which, when processed by a controller transforms an appropriately configured machine executing machine executable instructions 1604 into a data encoder incorporating one or more of the innovative aspects of the present invention described above. In accordance with the illustrated example embodiment of FIG. 15, storage medium 1602 is intended to represent any of a number of alternative storage media including, but not limited to, floppy disks, magnetic tape, compact disk, digital versatile disk, optical disks, and the like. Further, those skilled in the art will appreciate that the machine executable instructions need not be located within the an executing machine itself, but may be accessed from coupled network devices.

Those skilled in the art will appreciate that innovative encoder 1500 may well be embodied in any of a number of different forms. In addition to the embodiments described above, those skilled in the art will appreciate that the teachings of the present invention may well be integrated with a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuits (ASIC), programmable logic devices (PLD), microcontroller, processor and the like.

Thus, alternative embodiments for a method and apparatus for simplifying frame-based motion estimation has been described. While the method and apparatus of the present invention has been described in terms of the above illustrated embodiments, those skilled in the art will recognize that the invention is not limited to the embodiments described. Thus, those skilled in the art will appreciate that the present invention can be practiced with modification and alteration within the spirit and scope of the appended claims. Accordingly, the descriptions thereof are to be regarded as illustrative instead of restrictive on the present invention.

What is claimed is:

1. A method for performing motion estimation comprising:

receiving a stream of data comprising one or more bidirectionally interpolated frames (B-frame) and a plurality of anchor frames; and unidirectionally predicting content of each B-frame from a temporally closest anchor frame, wherein, with respect to each B-frame:

if the temporally closest anchor frame is previous to the B-frame, only unidirectionally forward predicting the content of the B-frame from only the temporally closest anchor frame;

if the temporally closest anchor frame is subsequent to the B-frame, only unidirectionally backward predicting the content of the B-frame from only the temporally closest anchor frame; and wherein the unidirectionally predicted B-frame that is predicted only from the temporally closest anchor frame comprises a frame that is defined as a bi-directionally predicted frame according to an encoding protocol for the stream of data.

2. The method of claim 1, wherein the content of the B-frames is unidirectionally predicted from the content of the temporally closest anchor frame and one or more motion vectors.

3. The method of claim 2, wherein the one or more motion vectors represent an activity measure of the temporally closest anchor frame.

4. The method of claim 3, wherein the motion vector is determined by a sum of absolute differences in activity within the temporally closest anchor frame.

5. The method of claim 1, wherein the plurality of anchor frames and B-frames contain progressive video content.

6. The method of claim 1, wherein the plurality of anchor frames and B-frames contain interlaced video content.

7. A computer readable medium having stored thereon a plurality of computer executable instructions that, in response to being executed result, in an apparatus performing a method for motion estimation comprising:

receiving a stream of data comprising one or more bidirectionally interpolated frames (B-frame) and a plurality of anchor frames; and unidirectionally predicting content of each B-frame from a temporally closest anchor frame, wherein, with respect to each B-frame:

if the temporally closest anchor frame is previous to the B-frame, only unidirectionally forward predicting the content of the B-frame from only the temporally closest anchor frame;

if the temporally closest anchor frame is subsequent to the B-frame, only unidirectionally backward predicting the content of the B-frame from only the temporally closest anchor frame; and wherein the unidirectionally predicted B-frame that is predicted only from the temporally closest anchor frame comprises a frame that is defined as a bi-directionally predicted frame according to an encoding protocol for the stream of data.

8. The computer readable medium of claim 7, wherein the content of the B-frames is unidirectionally predicted from the content of the temporally closest anchor frame and one or more motion vectors.

9. The computer readable medium of claim 8, wherein the one or more motion vectors represent an activity measure of the temporally closest anchor frame.

10. The computer readable medium of claim 9, wherein the motion vector is determined by a sum of absolute differences in activity within the temporally closest anchor frame.

11. The computer readable medium of claim 7, wherein the plurality of anchor frames and B-frames contain progressive video content.

12. The computer readable medium of claim 7, wherein the plurality of anchor frames and B-frames contain interlaced video content.

* * * * *